United States Patent
Keen et al.

(10) Patent No.: US 10,212,529 B1
(45) Date of Patent: *Feb. 19, 2019

(54) HOLOGRAPHIC VISUALIZATION OF MICROPHONE POLAR PATTERN AND RANGE

(71) Applicant: International Business Machines Corporation, Armonk, NY (US)

(72) Inventors: Martin G. Keen, Cary, NC (US); Adam Smye-Rumsby, Reading, PA (US); Paul A. R. Frank, Berlin (DE); Hernan A. Cunico, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,279

(22) Filed: Dec. 28, 2017

Related U.S. Application Data

(63) Continuation of application No. 15/829,406, filed on Dec. 1, 2017.

(51) Int. Cl.
*H04R 3/00* (2006.01)
*H04R 29/00* (2006.01)
*H04N 9/31* (2006.01)

(52) U.S. Cl.
CPC ......... *H04R 29/004* (2013.01); *H04N 9/3188* (2013.01); *H04R 29/008* (2013.01)

(58) Field of Classification Search
None
See application file for complete search history.

(56) References Cited

U.S. PATENT DOCUMENTS

| 7,027,603 B2* | 4/2006 | Taenzer ............ H04R 1/08 381/356 |
| 8,228,575 B2 | 7/2012 | McKelvey et al. |
| 8,847,919 B2 | 9/2014 | Krah |

(Continued)

FOREIGN PATENT DOCUMENTS

WO  03049494 A1  6/2003

OTHER PUBLICATIONS

Farina, A., et al., "A Spherical Microphone Array for Synthesizing Virtual Directive Microphones in Live Broadcasting and in Post Production", AES 40th International Conference, Oct. 8-10, 2010, 11 oages, Tokyo, Japan http://pcfarina.eng.unipr.it/Public/Premio-Sapio-2013/03-AES-40.pdf.

Lucente, M., et al., "Rendering Interactive Holographic Images", ACM, 1995, pp. 387-394 http://www.loreti.it/download/pdf/olografia/holovideo/mit/siggraph95.pdf.

(Continued)

*Primary Examiner* — Peter Vincent Agustin
(74) *Attorney, Agent, or Firm* — Scully, Scott, Murphy & Presser, P.C.; Richard Wilhelm, Esq.

(57) ABSTRACT

A method, system, and computer product for providing a visual indication of sound capture capability of a microphone includes receiving data corresponding to a polar pattern and a sound capture range of the microphone from a memory, generating a projection signal based on the data corresponding to the polar pattern and the sound capture range provided from the memory, generating a virtual image based on the projection signal, and projecting the generated virtual image near a sound source. The virtual image provides a visual indication of capability of the microphone to capture a sound generated by the sound source.

8 Claims, 12 Drawing Sheets

(56) References Cited

U.S. PATENT DOCUMENTS

| | | | |
|---|---|---|---|
| 9,727,144 B2 | 8/2017 | Yun et al. | |
| 2004/0137954 A1 | 7/2004 | Engstrom et al. | |
| 2006/0222187 A1* | 10/2006 | Jarrett | H04R 3/002 381/92 |
| 2006/0291816 A1* | 12/2006 | Ozawa | G06K 9/00234 386/248 |
| 2009/0310802 A1* | 12/2009 | Zhang | H04S 7/302 381/300 |
| 2011/0222373 A1* | 9/2011 | Lee | G01S 5/18 367/124 |
| 2012/0195435 A1* | 8/2012 | Ojanpera | G10L 19/008 381/17 |
| 2012/0300014 A1* | 11/2012 | Krantz | H04N 7/142 348/14.08 |
| 2013/0226322 A1* | 8/2013 | Ojanpera | H04H 60/04 700/94 |
| 2015/0124167 A1* | 5/2015 | Arrasvuori | H04R 3/005 348/485 |
| 2015/0146269 A1 | 5/2015 | Lee et al. | |
| 2015/0293497 A1 | 10/2015 | Song et al. | |
| 2016/0249134 A1* | 8/2016 | Wang | H04R 3/005 |
| 2018/0007481 A1* | 1/2018 | Tawada | G06T 11/001 |

OTHER PUBLICATIONS

Mathews, L., et al., "$30 chip turns smartphones into holographic projectors", Jun. 3, 2014, 9 pages. http://www.geek.com/chips/30-chip-turns-smartphones-into-holographic-projectors-1595601/.

Ochiai, Y., et al., "Fairy Lights in Femtoseconds: Aerial and Volumetric Graphics Rendered by Focused Femtosecond Laser Combined with Computational Holographic Fields", submitted on Jun. 22, 2015, 14 pages.

Hawley, S. H., et al., "Visualizing Sound Directivity via Smartphone Sensors", The Physics Teacher, last revised Feb. 21, 2017, 8 pages, 56, 72 https://arxiv.org/pdf/1702.06072.

Russon, M.-A., "Touchable 3D holograms in daylight now possible using superfast femtosecond lasers", Jun. 30, 2015, 3 pages https://www.ibtimes.co.uk/touchable-3d-holograms-daylight-now-possible-using-superfast-femtosecond-lasers-1508599.

Ouellette, J., "These Spherical Microphone Arrays Make Holographic Images of Sound", Jan. 2, 2016, 4 pages http://gizmodo.com/these-spherical-microphone-arrays-make-holographic-imag-1741535712.

List of IBM Patents or Patent Applications Treated as Related dated Dec. 28, 2017, 2 pages.

* cited by examiner

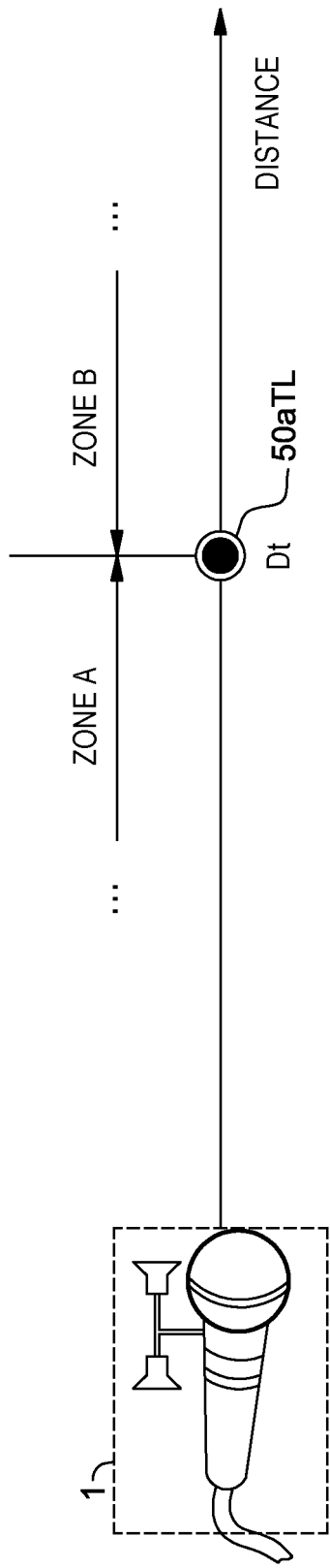

| PARAMETER OF SOUND (X) | ZONE | POLAR PATTERN | RANGE |
|---|---|---|---|
| $Thp1 \leq X < Thp2$ | ZONE 1 | POLP1 | R1 |
| $Tht \leq X < Thp1$ | ZONE 2 | POLP2 | R2 |
| $Thn1 \leq X < Tht$ | ZONE 3 | POLP3 | R3 |
| $Thn2 \leq X < Thn1$ | ZONE 4 | POLP4 | R4 |
| ... | ... | ... | ... |

HOLOGRAPHIC VISUALIZATION OF MICROPHONE POLAR PATTERN AND RANGE

FIELD

The present disclosure relates to visualizing sound capture capability of a microphone to make sure that a sound source is at a position where a sound can be picked up by the microphone.

BACKGROUND

A volume level or quality of a sound captured by a microphone depends on a position of a sound source with respect to a microphone. For example, as the sound source gets closer to the microphone, the volume level or the quality of the sound to be captured by the microphone may be increased. In addition, the better the sound source is aligned along with a microphone's polar pattern, the higher volume level or quality of the sound can be achieved.

To determine if a sound is sufficiently captured, for example, a volume level of the sound can be checked using an audio meter or a sound engineer wearing headphones may listen to the sound captured, so that the microphone or the sound source can be repositioned to make sure the sound source is at an appropriate position.

However, it is not easy for a user speaking to a camera or microphone to know whether he/she or other sound source is in a right position, a sound generated therefrom can be picked up by the microphone.

SUMMARY

In an aspect of the present disclosure, a method includes receiving data corresponding to a polar pattern and a sound capture range of the microphone from a memory, generating a projection signal based on the data corresponding to the polar pattern and the sound capture range provided from the memory, generating a virtual image based on the projection signal, and projecting the generated virtual image near a sound source. The virtual image provides a visual indication of capability of the microphone to capture a sound generated by the sound source.

In an aspect of the present disclosure, an apparatus including a microphone is provided. The apparatus includes a memory, one or more processors, and one or more projectors. The memory stores data corresponding to a polar pattern and a sound capture range of the microphone. The one or more processors coupled to the memory are configured to generate a projection signal based on the data corresponding to the polar pattern and the sound capture range provided from the memory. The one or more projectors are configured to generate a virtual image based on the projection signal and project the generated virtual image near a sound source. The virtual image provides a visual indication of capability of the microphone to capture a sound generated by the sound source.

In an aspect of the present disclosure, a computer program product comprising a computer readable storage medium having computer readable program instructions embodied therewith is provided. The computer readable program instructions executable by at least one processor to cause a computer to perform a method including: receiving data corresponding to a polar pattern and a sound capture range of the microphone from a memory, generating a projection signal based on the data corresponding to the polar pattern and the sound capture range provided from the memory, generating a virtual image based on the projection signal, and projecting the generated virtual image near a sound source. The virtual image provides a visual indication of capability of the microphone to capture a sound generated by the sound source.

BRIEF DESCRIPTION OF THE DRAWINGS

FIGS. 5A to 5C, 6A, and 6B depict diagrams for showing various projection area calibration scenarios according to an embodiment of the present disclosure;

DETAILED DESCRIPTION

Figure 1A:
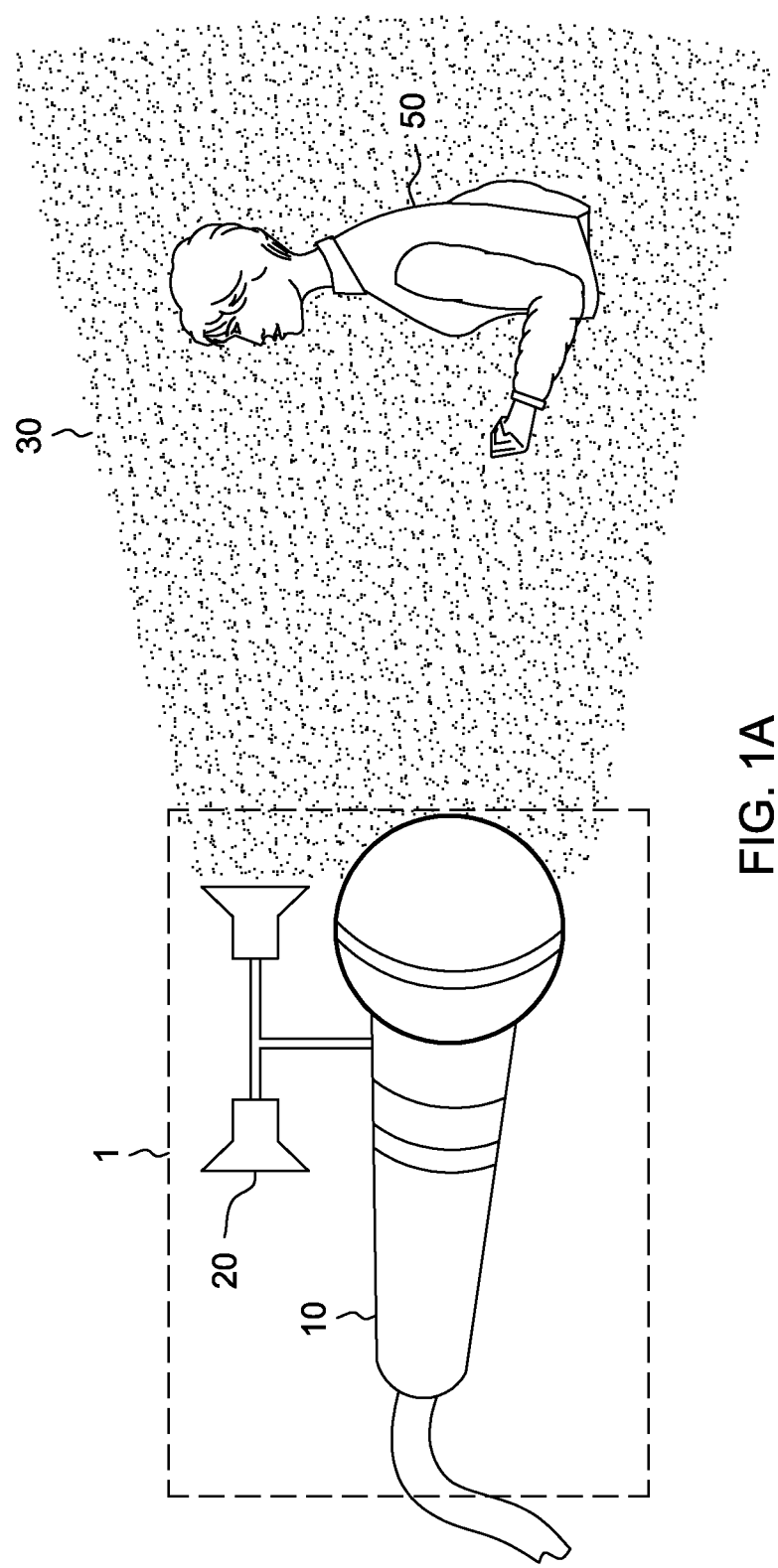
FIG. 1A depicts an example audio apparatus that projects a holographic image using one or more holographic projectors according to an embodiment of the present disclosure.

Embodiments of the present disclosure will now be described in detail with reference to the drawings. However, the following embodiments do not restrict the invention claimed in the claims. Moreover, all combinations of features described in the embodiments are not necessarily mandatory for the architecture of the present invention. Like numbers are assigned to like elements throughout the description of the embodiments of the present invention.

It will be understood that, although the terms first, second, third, etc. may be used herein to describe various elements. However, locations of these elements or orders where the elements are arranged should not be limited by these terms. Instead, these terms are only used to distinguish one element from another element.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this standard, specify the presence of stated features, integers, steps, operations, elements, and/or components, but do not preclude the presence or addition of one or more other features, integers, steps, operations, elements, components, and/or groups thereof.

An audio apparatus according to an embodiment of the present disclosure includes a microphone system and one or more holographic projectors and provides a holographic visualization (or holographic image) on sound capture capability of the microphone system using the one or more holographic projectors. For example, the holographic image shows a projection area of the microphone system with a polar pattern and a sound capture range thereof. Upon observing the holographic image projected by the audio apparatus, a user can recognize if he/she or other sound source is positioned within a projection area of the microphone system or out of the area. Thus, if it is recognized that the sound source is positioned out of the projection area, the sound source will be moved within the projection area.

In one embodiment, a holographic image is generated and projected into the air near a sound source using one or more projectors (e.g., holographic projectors). The holographic image can indicate for which direction and distance a sound generated from the sound source can be picked up or recorded by the microphone system. The shape or size of the holographic image corresponding to the projection area is calibrated based on analysis results on one or more sounds generated at one or more distances. In one embodiment, a location where the sound source is positioned to generate a test sound is preset and known to the microphone system. In another embodiment, the location where the sound source is positioned to generate the test sound is arbitrary chosen and determined using one or more image sensors or a camera attached to or adjacent to the microphone system to be incorporated into the audio apparatus.

Figures 1B, 2:
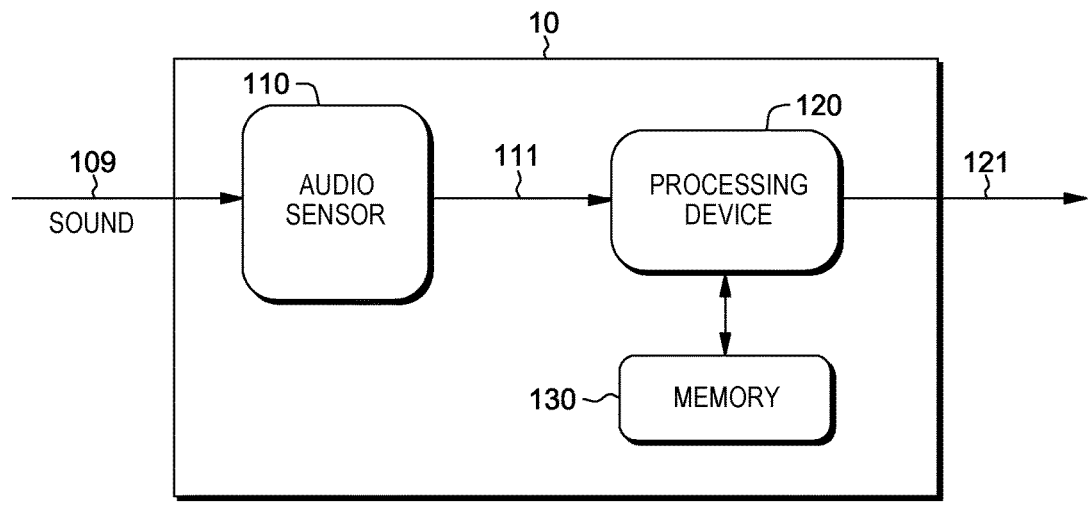
FIG. 1B depicts a functional block diagram of a microphone system according to an embodiment of the present disclosure.
FIG. 2 depicts example information of one or more polar patterns and corresponding sound capture ranges of a microphone system according to an embodiment of the present disclosure.

FIG. 1A depicts an example audio apparatus 1 that projects a holographic image 30 using one or more holographic projectors 20 according to an embodiment of the present disclosure. FIG. 1B depicts a functional block diagram of a microphone system according to an embodiment of the present disclosure. FIG. 2 depicts example information of one or more polar patterns and corresponding sound capture ranges of a microphone system according to an embodiment of the present disclosure.

Referring now to FIGS. 1A and 1B, the audio apparatus 1 may include a microphone 10, one or more holographic projectors 20. The microphone system 10 may be configured to capture a sound 109 from a sound source 50 by converting air pressure variations of the sound 109 to an audio electrical signal 111 and send the captured electrical signal 111 to various secondary devices (e.g., speaker, communication device, etc.). To this end, the microphone 10 may include one or more audio sensors (e.g., sound transducers) 110. The microphone system 10 may further include a processing device 120 and a memory 130 as depicted in FIG. 1B. The memory 130 may store information 200 including one or more polar patterns and corresponding sound capture ranges of the microphone system 1 as depicted in FIG. 2. Referring back to FIG. 1B, the processing device 120 may receive the information 200 of the polar patterns and the ranges of the microphone system 10 from the memory 130 to generate a projection signal 121. For example, the projection signal 121 is a signal to control operations of the one or more holographic projectors 20 for generating of the holographic image 30, defining a shape, density, and/or size thereof, turning on or off of the holographic projectors 20, etc. The one or more holographic projectors 20 may be mounted to or disposed adjacent to the microphone 10.

For example, the polar pattern of the microphone system 10 is determined by the arrangement of one or more audio sensors 110 therein. The audio sensors 110 are configured to receive a sound (e.g., 109 of FIG. 1B) with air pressure variations and output an audio electrical signal (e.g., 111 of FIG. 1B) corresponding to the air pressure variations. If the one or more audio sensors 110 are all positioned in the front of the microphone system 10, the polar pattern may be omnidirectional. If there are also additional audio sensors in the rear, the microphone system 10 can support a hypercardioid polar pattern. Therefore, some microphone systems may support only a single polar pattern, and other microphone systems can support multiple polar patterns; in this case, users will select a polar pattern that they want.

In one embodiment, if the microphone system 10 can support only a single polar pattern, the memory 130 may include only the single polar pattern and a corresponding range. Further, if the microphone system 10 can support multiple polar patterns, the memory 130 may include those multiple polar patterns and ranges corresponding to the multiple polar patterns, as exemplarily depicted in FIG. 2.

The sound capture area (e.g., corresponding to the projection area of the holographic image 30) of the microphone system 10 may be determined by the section of a polar pattern and a corresponding range. Thus, in order to generate the projection signal 121 used for generating the holographic image 30 showing the sound capture area of the microphone system 10, the processing device 120 needs to know information with regard to, for example, which polar pattern has been selected and what was a corresponding range of that selected polar pattern.

In one embodiment, a user may select a polar pattern to be used in the microphone system 10, and the selection result may be provided and known to the processing device 120. The processing device 120 may receive a particular polar pattern and its corresponding range (which are matched to the selection result regarding a polar pattern known to the processing device 120) from the memory 130. For example, if the microphone system 10 can support multiple polar patterns, the processing device 120 may select a pair of a polar pattern and its corresponding range from the information 200 stored in the memory 130 of FIG. 2 and may receive the selected polar pattern and its corresponding range for processing from the memory 130. The selected polar pattern and its corresponding range will be matched to the ones known to the processing device 120.

The processing device 120 generates the projection signal 121 based on the received polar pattern and the range provided from the memory 130, and provides the generated projection signal 121 to the one or more holographic projectors 20. The one or more holographic projectors 20 generates the holographic image 30 based on the projection signal 121 and projects the generated holographic image 20 near the sound source 50, as exemplarily illustrated in FIG. 1A.

Figure 3A:
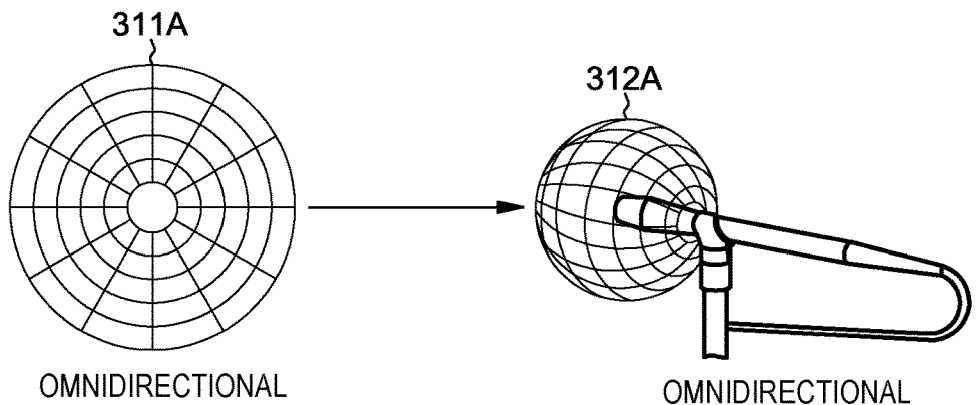
FIGS. 3A to 3C are diagrams of example polar patterns and holographic images projected for the polar patterns according to an embodiment of the present disclosure.
Figure 3B:
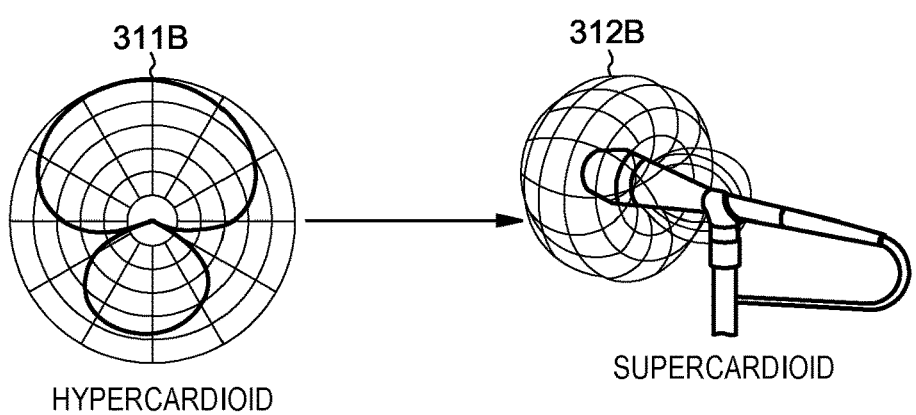
Figure 3C:
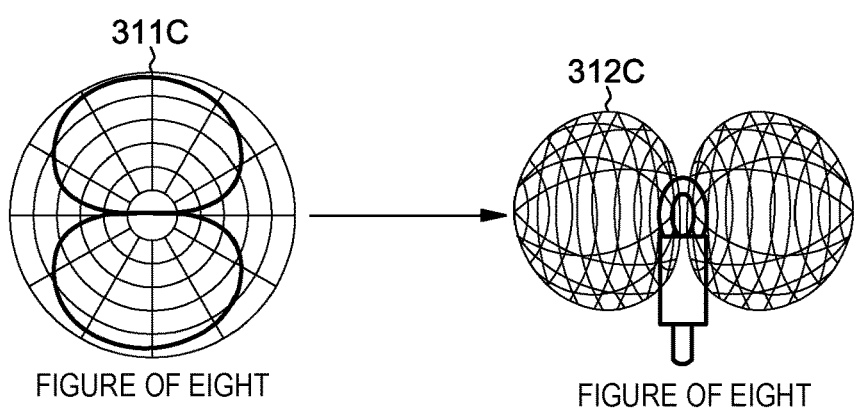

FIGS. 3A to 3C are diagrams of example polar patterns and holographic images projected for the polar patterns according to an embodiment of the present disclosure. It should be appreciated that the diagrams of FIGS. 3A to 3C are intended to be illustrative only and embodiments of the present disclosure are not limited thereto. For example, an omindirectional polar pattern 311A and an example corresponding holographic image 312A are shown in FIG. 3A. A hypercardiod polar pattern 311B and an example corresponding holographic image 312B are shown in FIG. 3B. A figure of eight polar pattern 311C and an example corresponding holographic projection image 312C are shown in FIG. 3C. It should be noted that the shape of each holographic images 312A, 312B, and 312C are dictated by a corresponding polar pattern of a microphone system (e.g., 10), as shown in FIGS. 3A to 3C.

In one embodiment, the holographic image 30 may be filled with various patterns or forms whose density or brightness are varying with a level of the sound capture capability of the microphone system 10 (e.g., how well a microphone system can capture a sound), For example, the holographic image 30 may be filed with different gray (or color) shades as shown in FIG. 1A; the higher the sound capture capability, the darker the gray shade of the holographic image 30. In another example, the holographic image 30 may be filed with different density of pattern (not shown); the higher the sound capture capability, the denser the pattern of the holographic image 30.

In one embodiment, the audio apparatus 1 may perform a calibration on a projection area, (e.g., shape or size) of the holographic image 30. This enables to calibrate the range of the holographic image 30 representing how far away a microphone system can pick up a particular sound in a particular environment. For example, a test sound source for calibration may be located at one or more particular locations, generating corresponding one or more test sounds (e.g., human voice, musical instruments, etc.), and the test sounds may be recorded with their corresponding locations (or distances from the microphone system) by the microphone system 10 for further analysis. In the analysis, the microphone system 1 may determine whether the test sound meets a predetermined criterion. If the test sound meets the predetermined criterion, the microphone system 10 may determine that the test sound source is within a sound capture range of the microphone system 10 and calibrate the projection area of the holographic image 30 to cover that test location. In the calibration, a new pair of a polar pattern and a range corresponding to the calibrated projection area of the holographic image 30 can be selected from the information 200 stored in the memory 130.

In one embodiment, the above one or more particular test locations where the sound source 50 is located to generate the one or more corresponding test sounds are defined by a user or preset in the microphone system 10 and are known to the microphone system 10 (e.g., stored in the memory 130). In another embodiment, the above one or more particular test locations are arbitrarily chosen without being known to the microphone system 10, so that the microphone system 10 should determine the locations or distances from the microphone system 10 using a camera or one or more image sensors which are attached to or adjacent to the microphone system 10.

In one embodiment, the predetermined criterion includes, but is not limited to: whether a volume level of a test sound captured by the microphone system 10 is higher than a certain threshold and whether a quality value of the sound (e.g., signal-to-noise ratio) captured by the microphone system 10 is higher than a certain threshold.

Figure 4A:
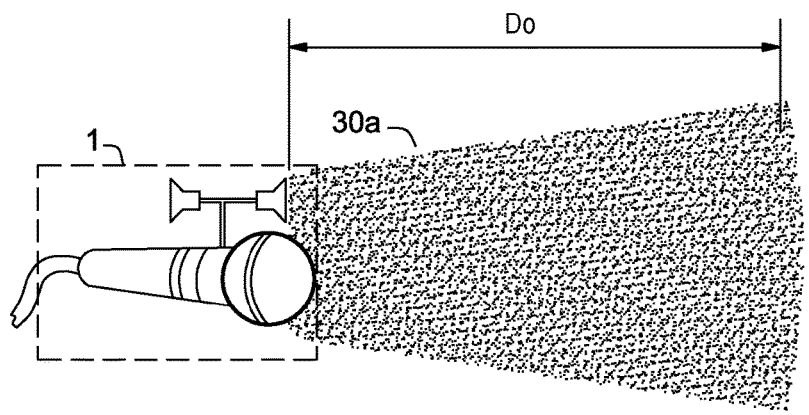
FIGS. 4A and 4B depict diagrams for calibrating a projection area of a holographic image of a microphone system when a test location for calibration is preset and known to the microphone system according to an embodiment of the present disclosure.
Figure 4B:
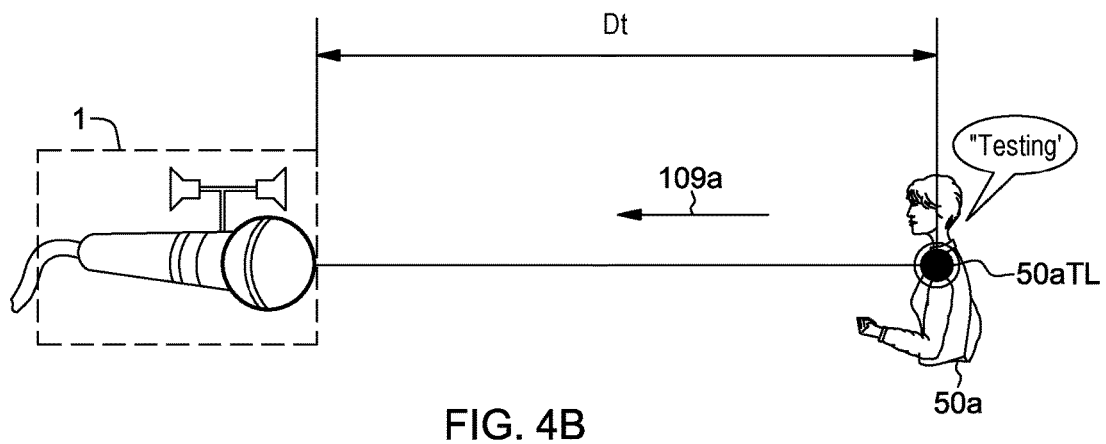

FIGS. 4A and 4B depict diagrams for calibrating a projection area of a holographic image of a microphone system when a test location for calibration is preset and known to the microphone system according to an embodiment of the present disclosure. FIGS. 5A to 5C, 6A, and 6B depict diagrams for showing various projection area calibration scenarios according to an embodiment of the present disclosure.

As depicted in FIG. 4A, the microphone system 10 may project a holographic image 30a with a projection area having a range of Do from the microphone system 10 before the holographic image 30a is calibrated, according to an embodiment of the present disclosure. For example, the polar pattern and the range of the holographic image 30a shown in FIG. 4A are selected and generated without being calibrated.

In the calibration according to an embodiment, a sound source 50a generates a sound 109a (e.g., "testing") at a test location 50aTL having a distance Dt from the microphone system 10, as depicted in FIG. 4B. As described above, the microphone system 10 may capture the test sound 109a from the sound source 50a at a test location 50aTL and analyze the captured sound 109a whether the sound 109a meets the above-mentioned predetermined criterion.

Figure 5A:
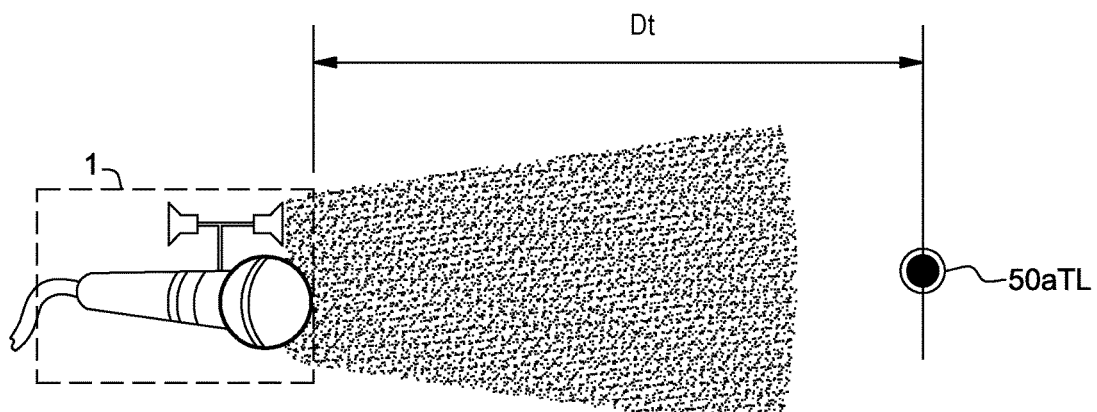

If the test sound 109a does not meet the predetermined criterion (for example, if the volume level of the sound 109a captured by the microphone system 10 is lower than a certain volume threshold; or if a quality value of the sound 109a (e.g., signal-to-noise ratio) captured by the microphone system 10 is lower than a certain quality threshold, the microphone system 10 may determine that the test location 50aTL is out of the sound capture range of the microphone system 10 and calibrate a projection area of the holographic image 30a not to cover the testing location 50aTL, as shown in FIG. 5A.

Figure 5B:
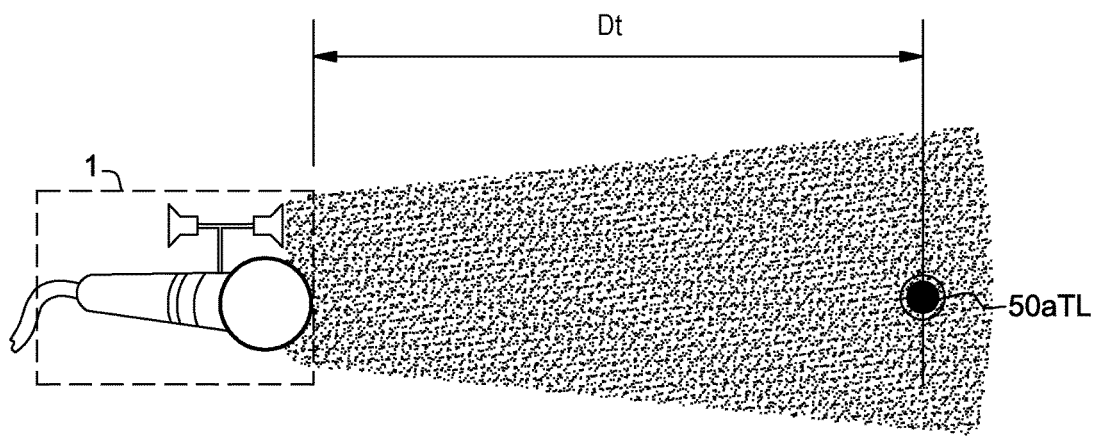

If the test sound 109a meets the predetermined criterion (for example, if the volume level of the sound 109a captured by the microphone system 10 is higher than the volume threshold; if the quality value of the sound 109a captured by the microphone system 10 is higher than the quality threshold, the microphone system 10 may determine that the test location 50aTL is within the sound capture range of the microphone system 10 and calibrate the projection area of the holographic image 30a to cover the testing location 50aTL, as shown in FIG. 5B.

For example, the calibrating of a projection area of a holographic image includes: newly selecting a pair of a polar pattern and a range from the memory 130 corresponding to a target projection area (e.g., post-calibrated projection area); and generating a calibrated holographic image with the target project area based on the newly selected pair of the polar pattern and the range.

In one scenario, in case where the test sound 109a does not meet the predetermined criterion, if a pre-calibrated projection area of the holographic image 30a covers the test location 50aTL (or extends beyond the test location 50aTL), the calibration may be made to have the projection area reduced, and so the post-calibrated projection area does not cover the test location 50aTL; but if the pre-calibrated projection area does not cover the test location 50aTL, the calibration might not be needed.

In another scenario, in case where the test sound 109a meets the predetermined criterion, if the pre-calibrated projection area of the holographic image does not cover the test location 50aTL (or does not reach the test location 50aTL), the calibration may be made to have the projection area further extended, and so the post-calibrated projection area covers the test location 50aTL; but if the pre-calibrated projection area covers the test location 50aTL, the calibration might not be needed.

As depicted in FIG. 5C, the calibration may be made for the farthest line of the projection area from the microphone system 10 to fall into either one of two zones such as zone A or a zone B depending on whether the test sound 109a meets the predetermined criterion. Exemplary embodiments of the present disclosure are not limited thereto. For example, the number of zones into which the farthest line of the project area from the microphone system 100 falls can be increased to improve the accuracy of the calibration of the projection area of the holographic image 30a.

Figures 6A, 6B:
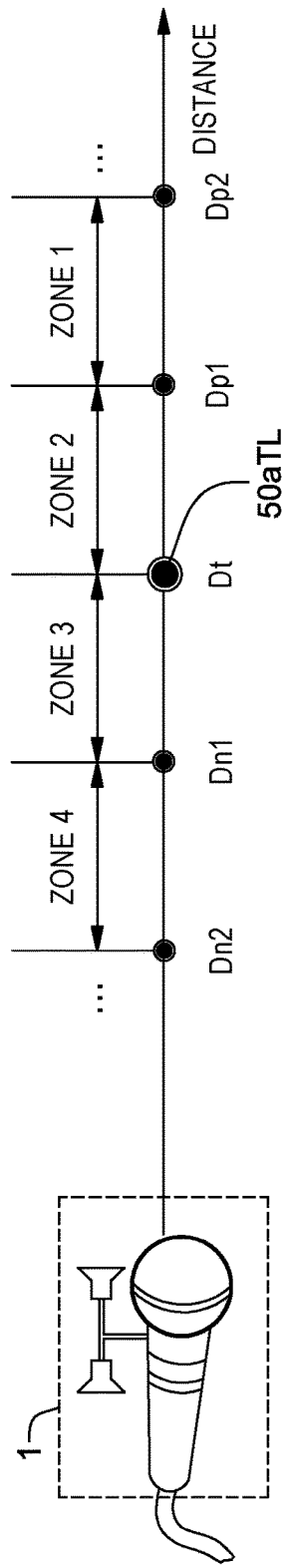

FIG. 6A depicts example multiple zones which a projection area of a holographic image falls into according to an embodiment of the present disclosure. FIG. 6B depicts a mapping table indicating relationships between one or more parameters (e.g., a volume level or a quality value) of the test sound 109a and a corresponding zone into which the farthest line of the projection area falls according to an embodiment of the present disclosure.

As depicted in FIG. 6A, each of reference characters Dn2, Dn1, Dt, Dp1, and Dp2 represents a distance from the microphone system 10 and they may be equally spaced. The test location 50aTL has the distance Dt from the microphone system 10. Referring to FIGS. 6A and 6B, if the parameter X of the test sound 109a ranges such that Thp1≤X<Thp2, the calibration may be made for the farthest line of the projection area to fall into the zone 1 by selecting a polar pattern POLP1 and its corresponding range R1 from the information 200 stored in the memory 130. In addition, if the parameter X of the test sound 109a ranges such that Tht≤X<Thp1, the calibration may be made for the farthest line of the projection area to fall into the zone 2 by selecting a polar pattern POLP2 and its corresponding range R2 from the information 200. Further, if the parameter X of the test sound 109a ranges such that Thn1≤X<Thnt, the calibration may be made for the farthest line of the projection area to fall into the zone 3 by selecting a polar pattern POLP3 and its corresponding range R3 from the information 200. Still further, if the parameter X of the test sound 109a ranges such that Thn2≤X<Thn1, the calibration may be made for the farthest line of the projection area to fall into the zone 4 by selecting a polar pattern POLP4 and its corresponding range R4 from the information 200.

Here, Thp2 is a threshold value corresponding to the distance Dp2. Thp1 is a threshold value corresponding to the distance Dp1. Tht is a threshold value corresponding to the distance Dt. Thn1 is a threshold value corresponding to the distance Dn1. Thn2 is a threshold value corresponding to the distance Dn2. In one aspect, Thp2 is greater than Thp1, Tph1 is greater than Tht, Tht is greater than Thn1, and Thn1 is greater than Thn2. The accuracy of the calibration will be increased as a width of each zone is reduced by increasing the number of zones.

In one embodiment, the test location 50aTL is not preset, instead arbitrarily defined by a user, and a distance of the test location 50aTL from the microphone system 10 may be determined by capturing images of the sound source 50a using an image capture device (e.g., camera, one or more image sensors, etc.) and performing image processing on the captured images using the processing device 120.

Figure 7:
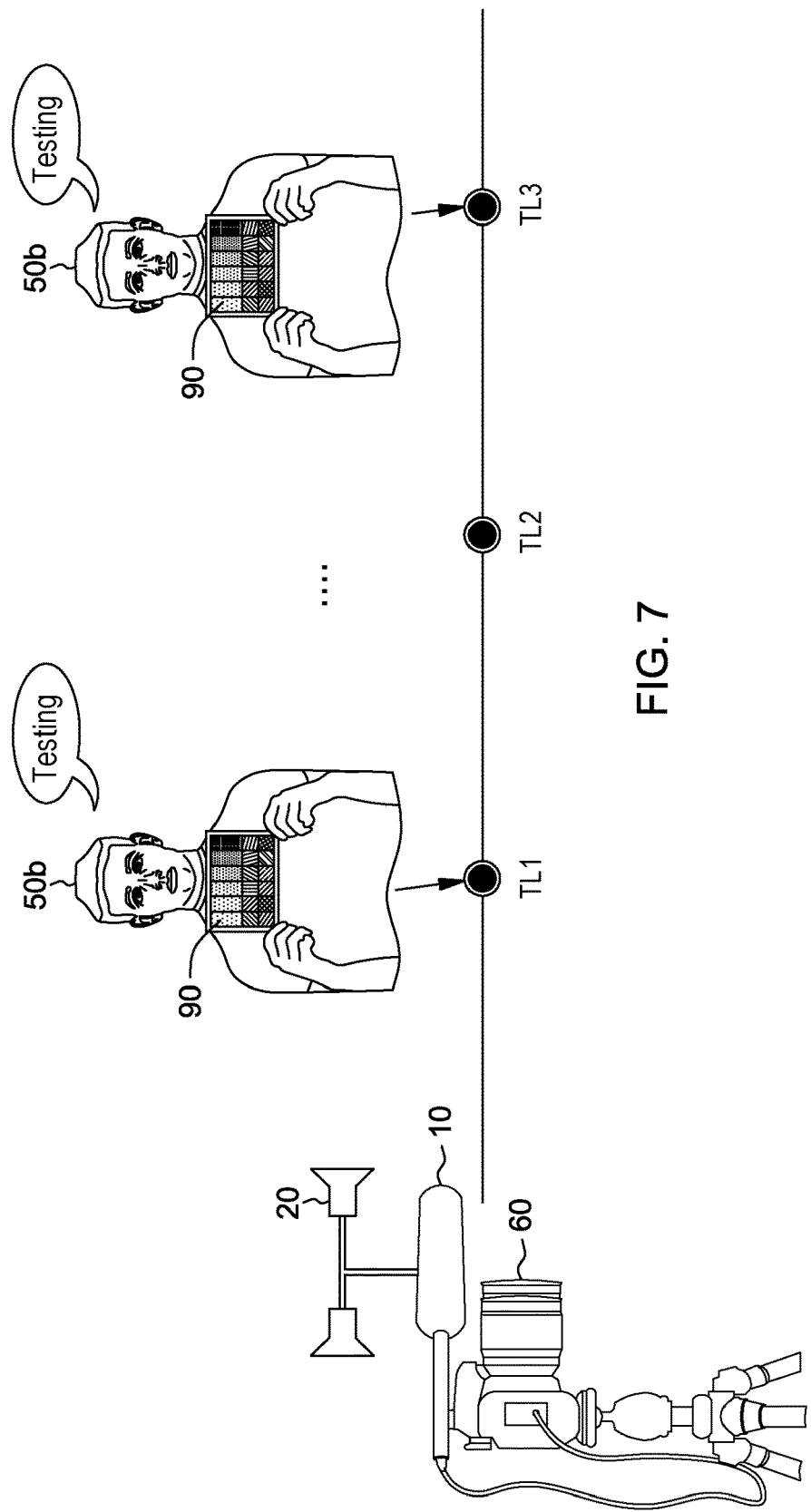
FIG. 7 depicts a diagram for showing a projection area calibration scenario where a test location is determined using an image capture device according to an embodiment of the present disclosure.

FIG. 7 depicts a diagram for showing a projection area calibration scenario where a test location is determined using an image capture device according to an embodiment of the present disclosure.

Referring to an example depicted in FIG. 7, three test locations TL1 to TL3 are used for calibration. However, the number of the test locations is not limited thereto in the present disclosure (e.g., one or more). For example, a sound source 50b generates a corresponding test sound, e.g., "testing", at each of the test locations TL1 to TL3 and the microphone system 10 captures a respective test sound generated at each of the test locations TL1 to TL3 and analyzes the captured test sound whether it meets the predetermined criterion. The analyzing of the captured test sound includes whether the test sound meets a predetermined criterion. For example, the predetermined criterion includes, but is not limited to: whether a volume level of the test sound captured by the microphone system 10 is higher than a certain threshold and whether a quality value of the test sound (e.g., signal-to-noise ratio) captured by the microphone system 10 is higher than a certain threshold.

As depicted in FIG. 7, an image capturing device 60 is mounted to or disposed adjacent to the microphone system 10. In one embodiment, a calibration-aid object 90 (e.g., a calibration card) is mounted to or located adjacent to the sound source 50b. The image capture device 60 may capture an image (including the sound source 50b with the calibration-aid object 90) from each test location TL1 to TL3 and the processing device 120 of the microphone system 10 may perform image processing on the image to determine how far away each test location TL1 to TL3 is positioned from the microphone system 10. For example, a scale of the calibration-aid object 90 decreases as its distance is away from the microphone system 10 and the memory 130 may store mapping data (not shown) between the scale of the calibration-aid object 90 and a corresponding distance from the microphone system 10. Thus, the processing device 120 may determine the corresponding distance of each test location TL1 to TL3 by looking up the mapping data between the scale of the calibration-aid object 90 and the corresponding distance stored in the memory 130.

In one example calibration scenario, if the processing device 120 determines that the test sound generated at the test location TL1 does not meet the predetermined criterion (e.g., if a volume level or a quality value of the test sound is lower than a certain level or negligibly low), the calibration may be made to have a projection area of the holographic image 30a not to cover the test location TL1. Further, if the processing device 120 determines that the test sound generated at the test location TL1 meets the predetermined criterion (e.g., if the volume level or quality value of the test sound is higher than the certain level or clear enough to recognize it) and a test sound generated at the test location TL2 does not meet the predetermined criterion, the calibration may be made to have the projection area to cover the test location TL1 but not to cover the test location TL2. Still further, if the processing device 120 determines that the test sound generated at the test location TL2 meets the predetermined criterion and a test sound generated at the test location TL3 does not meet the predetermined criterion, the calibration may be made to have the projection area to cover the test locations TL1 and TL2 but not to cover the test location TL3; in this case, the holographic image 30b near the test location TL1 may be shown to be darker or denser than the one near the test location TL2, given that the sound capture capability of the microphone system 10 near the test location TL1 is higher than that near the test location TL2.

In one embodiment, the smaller an interval between the test locations is, the more accurate calibration of the projection area will be. Thus, to increase accuracy of the calibration, the interval between the test locations can be reduced or the number of the test locations in a particular distance window can be increased.

Figure 8A:
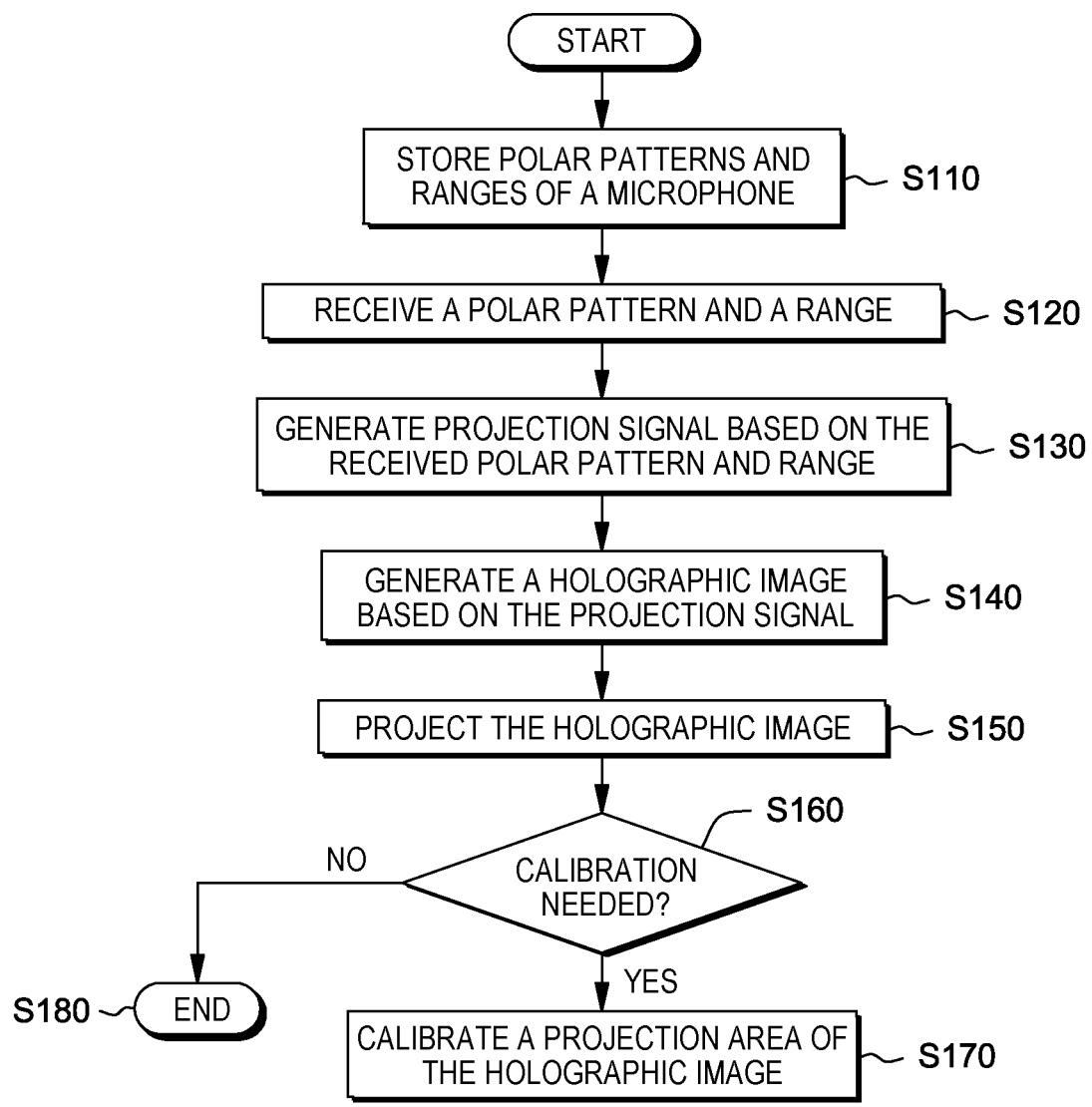
FIG. 8A is an example flow chart illustrating a method for projecting a holographic image representing sound capture capability of a microphone system according to an embodiment of the present disclosure.
Figure 8B:
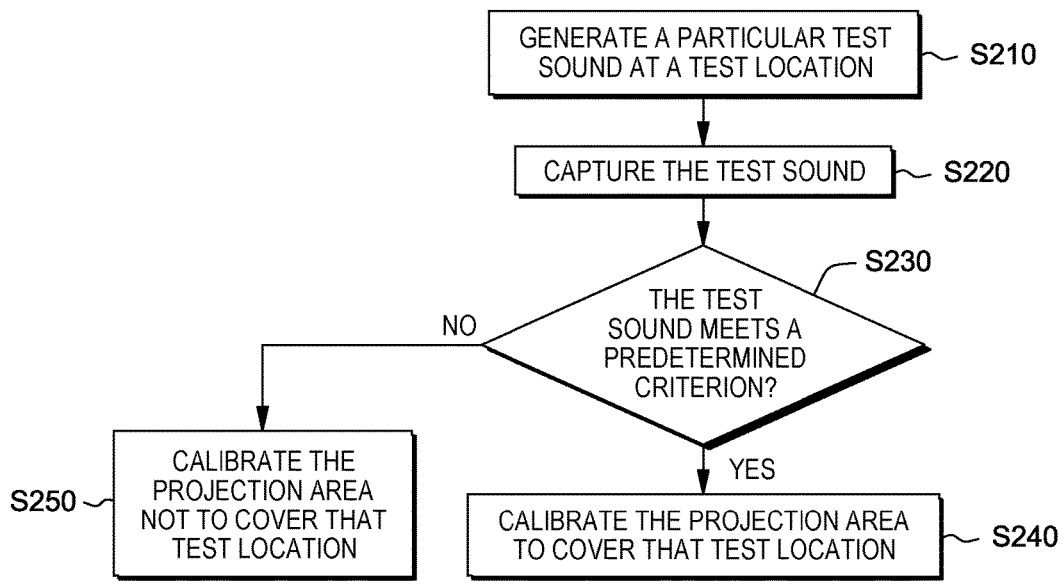
FIGS. 8B and 8C are example flow charts for calibrating a projection area of the holographic image according to an embodiment of the present disclosure.
Figure 8C:
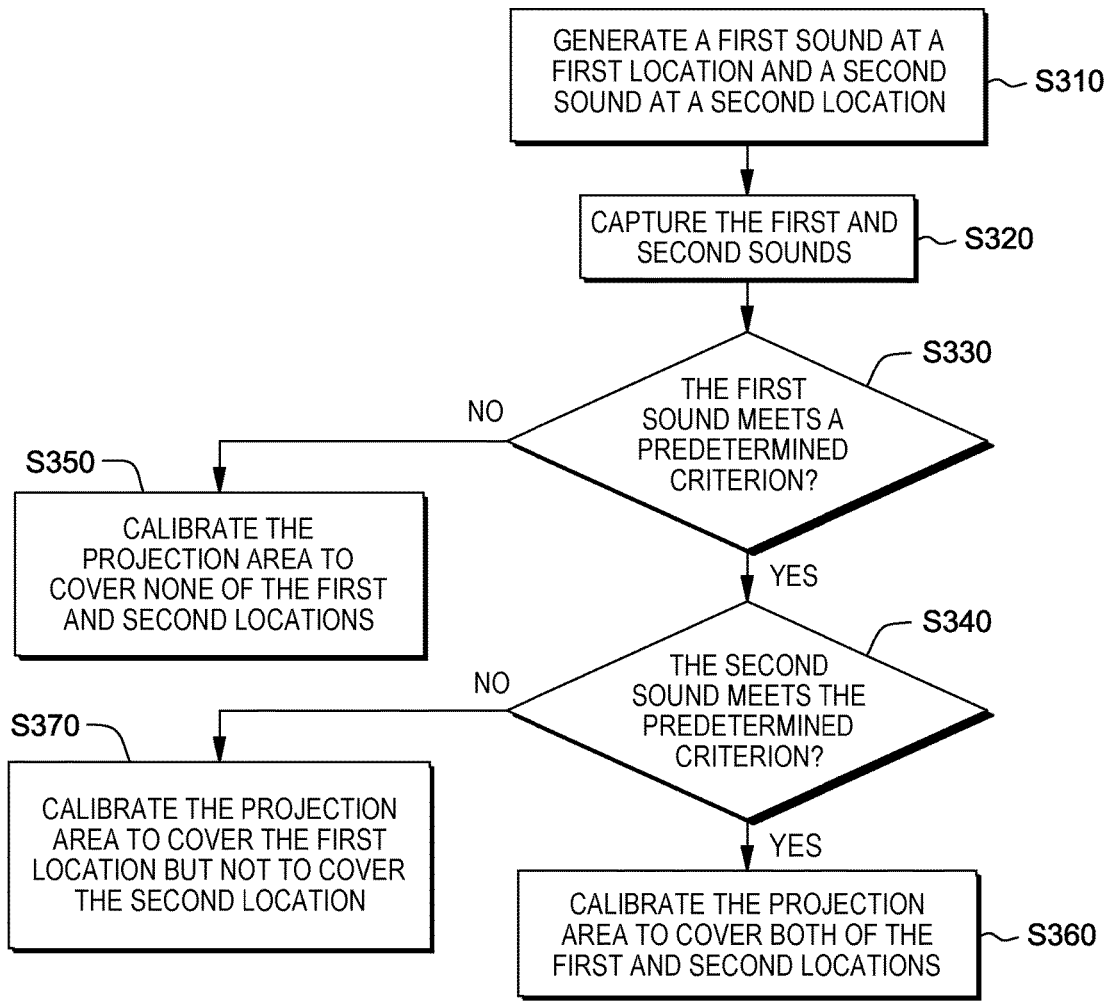

FIG. 8A is an example flow chart illustrating a method for projecting a holographic image representing sound capture capability of a microphone system according to an embodiment of the present disclosure. Each of FIGS. 8B and 8C is an example flow chart for calibrating a projection area of the holographic image according to an embodiment of the present disclosure.

Referring to the example depicted in FIGS. 1B and 8A, the method may include steps S110 to S180.

At S110, information (e.g., 200 of FIG. 2) including one or more pairs of polar patterns and respective sound capture ranges of a microphone system (e.g., 10 of FIG. 1B) may be stored in a memory (e.g., 130 of FIG. 1B). At S120, a processing device (e.g., 120 of FIG. 1B) may select and receive a pair of a polar pattern and its corresponding sound capture range from the memory and generate a projection signal (e.g., 121 of FIG. 1B) based on the received pair of the polar pattern and the sound capture range (S130).

Next, at S140, the processing device may control one or more holographic projectors (e.g., 20 of FIG. 1B) to generate a holographic image (e.g., 30 of FIG. 1A or 30a of FIG. 4A) based on the projection signal. The one or more holographic projectors 20 may project the holographic image near a sound source.

In one embodiment, the method may optionally include steps S160 to S170 where the processing device determines whether calibration for the holographic image is needed (S160). Upon determining that the calibration is needed, the processing device and the one or more holographic projectors may perform calibration on the shape or size of the holographic image, so the projection area of the holographic image covers (or does not cover) a particular location (S170). In some aspects, upon determining that the calibration is not needed, no calibration may be performed and the method ends (S180).

Referring to the example depicted in FIGS. 1B, 5A to 5C, 6A, 6B, 7, 8A, and 8B, the above calibration steps S160 to S180 may include that: a sound source (e.g., 50 of FIG. 1A or 50a of FIG. 4B) generates a particular test sound (e.g., 109a of FIG. 4B) at a test location (e.g., 50aTL of FIG. 4B) (S210); the processing device captures the particular test sound (S220) and analyzes the test sound to determine whether it meets the predetermined criterion (S230). If the test sound meets the predetermined criterion (YES), the processing device and the one or more holographic projectors may perform the calibration on a projection area of the holographic image covers the test location (S240). Otherwise (NO), the processing device and the one or more holographic projectors may perform the calibration on the projection area of the holographic image not to cover the test location (S250).

Referring to the example depicted in FIG. 1B, FIGS. 1B, 5A to 5C, 6A, 6B, 7, 8A, and 8C, the above calibration steps S160 to S180 may include that: a sound source (e.g., 50b of FIG. 7) generates a first test sound at a first test location (e.g., TL1) and a second test sound at a second test location (e.g., TL2) (S310); the processing device captures the first and second test sounds (S320) and analyzes the first and second test sounds to determine whether each of the test sounds meets the predetermined criterion (S330 and S340). If both of the first test sound and the second test sound meet the predetermined criterion (YES at S330 and YES at S340), the processing device and the one or more holographic projectors perform the calibration on a projection area of the holographic image to cover both of the first and second test locations (S360). If the first test sound meets the predetermined criterion (YES at S330) and the second test sound does not meet the predetermined criterion (NO at S340), the processing device and the one or more holographic projectors perform the calibration on the projection area of the holographic image to cover the first test location, but not to cover the second test location (S370). If the first test sound does not meet the predetermined criterion (NO at S330), the processing device and the one or more holographic projectors perform the calibration on the projection area to cover none of the first and second test locations (S350).

Figure 9:
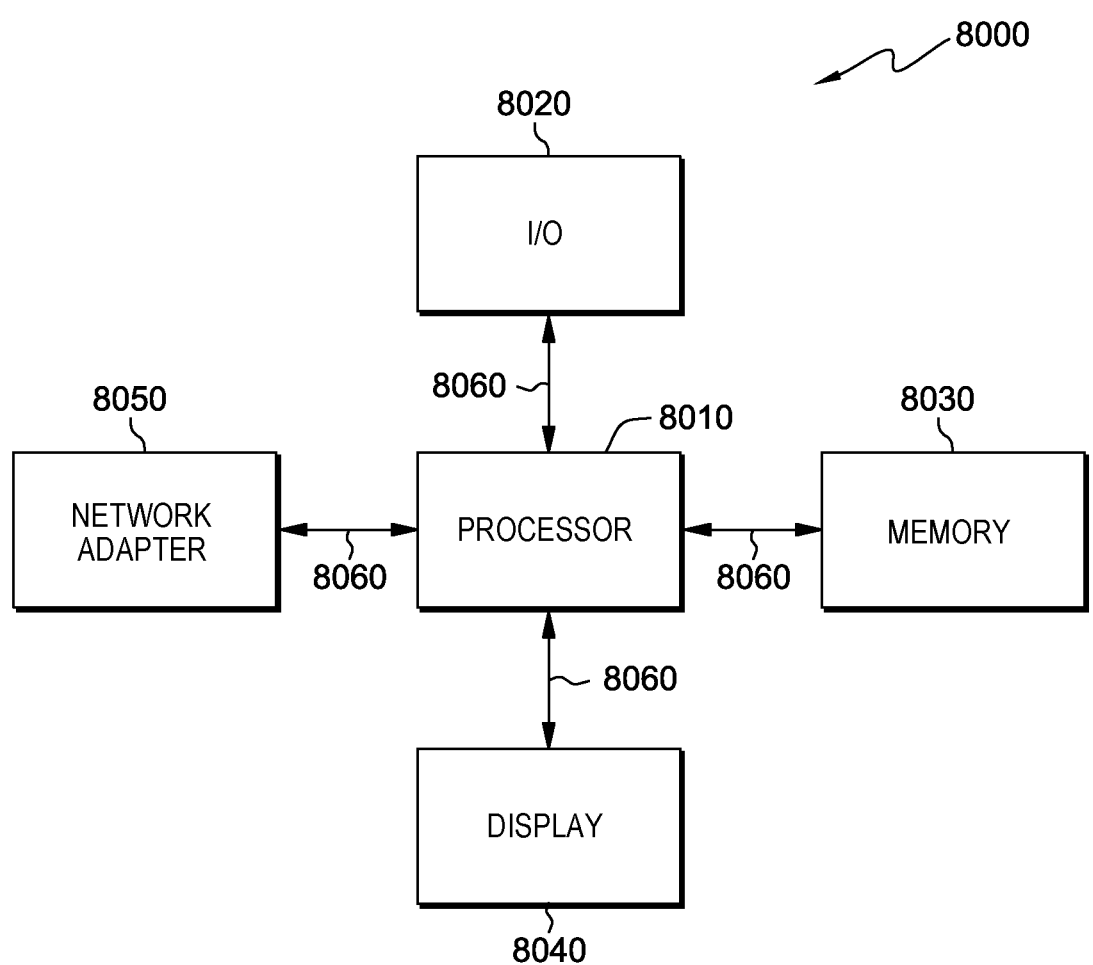
FIG. 9 is a block diagram of a computing system according to an embodiment of the present disclosure.

FIG. 9 is a block diagram of a computing system 8000 according to an exemplary embodiment of the present disclosure.

Referring to the example depicted in FIG. 9, a computing system 8000 may be used (without limitation) as a platform for performing (or controlling) the functions or operations described hereinabove with respect to the audio apparatus 1 of FIG. 1A, the microphone system 10 of FIG. 1B, the calibration for the holographic image projection area shown in FIGS. 5A to 5C, 6A, 6B, and 7, and/or the methods of FIGS. 8A to 8C.

In addition (without limitation), the computing system 8000 may be implemented with an UMPC, a net-book, a PDA, a portable computer, a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring now specifically to FIG. 9, the computing system 8000 may include a processor 8010, I/O devices 8020, a memory system 8030, a display device 8040, bus 8060, and a network adaptor 8050.

The processor 8010 is operably coupled to and may communicate with and/or drive the I/O devices 8020, the memory system 8030, the display device 8040, and the network adaptor 8050 through the bus 8060.

The computing system 8000 can communicate with one or more external devices using network adapter 8050. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The computing system 8000 may also include or access a variety of computing system readable media. Such media may be any available media that is accessible (locally or remotely) by a computing system (e.g., the computing system 8000), and it may include both volatile and non-volatile media, removable and non-removable media.

The memory system 8030 can include computer system readable media in the form of volatile memory, such as random access memory (RAM) and/or cache memory or others. The computing system 8000 may further include other removable/non-removable, volatile/non-volatile computer system storage media.

The memory system 8030 may include a program module (not shown) for performing (or controlling) the functions or operations described hereinabove with respect to the audio apparatus 1 of FIG. 1A, the microphone system 10 of FIG. 1B, the calibration for the holographic image projection area shown in FIGS. 5A to 5C, 6A, 6B, and 7, and/or the methods of FIGS. 8A to 8C according to exemplary embodiments. For example, the program module may include routines, programs, objects, components, logic, data structures, or the like, for performing particular tasks or implement particular abstract data types. The processor (e.g., 8010) of the computing system 8000 may execute instructions written in the program module to perform (or control) the functions or operations described hereinabove with respect to the audio apparatus 1 of FIG. 1A, the microphone system 10 of FIG. 1B, the calibration for the holographic image projection area shown in FIGS. 5A to 5C, 6A, 6B, and 7, and/or the methods of FIGS. 8A to 8C. The program module may be programmed into the integrated circuits of the processor (e.g., 8010). In some embodiments, the program module may be distributed among memory system 8030 and one or more remote computer system memories (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A method, comprising:
   receiving, at a processor, data corresponding to a polar pattern and a sound capture range of the microphone from a memory;
   generating, by the processor, a projection signal based on the data corresponding to the polar pattern and the sound capture range provided from the memory;
   generating, by one or more projectors, a virtual image based on the projection signal; and
   projecting, by one or more projectors, the generated virtual image near a sound source, the virtual image providing a visual indication of capability of the microphone to capture a sound generated by the sound source, and
   detecting a first sound generated at a first location by the sound source, the first location having a first distance from the microphone;
   determining whether the first sound meets a predetermined criterion; and
   calibrating a projection area of the virtual image based on a determination whether the first sound meets the predetermined criterion.

2. The method of claim 1, further comprising:
   calibrating a projection area of the virtual image by analyzing one or more sounds generated at one or more locations by the sound source.

3. The method of claim 1, wherein the calibrating a projection area of the virtual image comprises:
   calibrating the projection area not to cover the first location responsive to determining that the first sound does not meet the predetermined criterion; and
   calibrating the projection area to cover the first location responsive to determining that the first sound meets the predetermined criterion.

4. The method of claim 1, further comprising:
   detecting a second sound generated at a second location by the sound source, the second location having a second distance from the microphone;
   determining whether the second sound meets the predetermined criterion; and
   calibrating the projection area of the virtual image based on a determination whether the second sound meets the predetermined criterion.

5. The method of claim 4, wherein the calibrating a projection area of the virtual image comprises:
   calibrating the projection area not to cover the first location and cover the second location, further responsive to determining that the second sound meets the predetermined criterion; and
   calibrating the projection area to cover none of the first location and the second location, further responsive to determining that the second sound does not meet the predetermined criterion.

6. The method of claim 1, wherein the first location is preset and known to the microphone.

7. The method of claim 4, further comprising:
   determining the first distance of the first location and the second distance of the second location using images captured using one or more image sensors attached to or adjacent to the microphone.

8. The method of claim 1, wherein the predetermined criterion comprises at least one of:
   whether a volume level of the first sound is higher than a first threshold;
   whether a quality value of the first sound outputted from the microphone is higher than a second threshold.

* * * * *